United States Patent [19]

Withers

[11] Patent Number: 4,991,718

[45] Date of Patent: Feb. 12, 1991

[54] STARCH TRAY

[75] Inventor: John Withers, Stalham, England

[73] Assignee: Moores of Stalham (U.K.) Limited, Catfield, England

[21] Appl. No.: 328,954

[22] Filed: Mar. 27, 1989

[30] Foreign Application Priority Data

Apr. 15, 1988 [GB] United Kingdom ................. 8808979

[51] Int. Cl.$^5$ ............................................. B65D 21/02
[52] U.S. Cl. ..................................... 206/511; 206/512; 206/557
[58] Field of Search ............... 206/509, 511, 512, 507, 206/503, 557; 220/23.6

[56]  References Cited

U.S. PATENT DOCUMENTS

| | | | |
|---|---|---|---|
| 814,178 | 3/1906 | Waters | 206/509 |
| 2,246,448 | 6/1941 | Mahan, Jr. | 206/511 |
| 2,443,341 | 3/1945 | Butler | 206/503 |
| 2,822,106 | 2/1958 | Fabian et al. | 206/511 |
| 3,907,111 | 9/1975 | Levenhagen | 206/511 |
| 4,226,192 | 10/1980 | Myers | 206/503 |
| 4,441,615 | 4/1984 | Goodrich | 206/512 |
| 4,591,065 | 5/1986 | Foy | 206/512 |

FOREIGN PATENT DOCUMENTS

| | | | |
|---|---|---|---|
| 0063726 | 7/1945 | Denmark | 206/511 |
| 1054374 | 4/1959 | Fed. Rep. of Germany | 206/509 |
| 2645987 | 12/1976 | Fed. Rep. of Germany | 206/509 |
| 1167061 | 10/1956 | France | 206/509 |
| 0287047 | 2/1965 | Netherlands | 206/512 |

Primary Examiner—Paul T. Sewell
Assistant Examiner—Jacob K. Ackun, Jr.
Attorney, Agent, or Firm—Edwin D. Schindler

[57]   ABSTRACT

A rectangular starch tray having a flat base with an upstanding peripheral wall comprising side walls and end walls, the end walls having downwardly projecting portions cut away over the central region thereof to provide corner feet, the upstanding portions of the end walls each being shaped with a recess having a sloping bottom surface and the feet having downward projections which locate into the end regions of the recess when trays are stacked, thereby to minimize relative sliding movement between the stacked trays.

6 Claims, 2 Drawing Sheets

STARCH TRAY

FIELD OF THE INVENTION

This invention relates to a starch tray.

BACKGROUND TO THE INVENTION

Starch trays of rectangular shape, usually of hardwood timber, are employed in the confectionery trade for the manufacture of sweets. The trays are substantially filled with starch powder, which is packed flat and then stamped with a multiple head moulding tool to form impressions in the layer of starch. These impressions are filled with a prescribed quantity of fluid sweet mixture, which is caused to solidify by air drying or oven drying. The tray is then tipped out, the sweets for packaging and the starch powder for recycling. During drying of the sweet mixture, the trays are stacked one on top of the other. The stacking requirement may be for as many as forty trays, and the achievement of a stable stack is essential. Most desirably, the trays in the stack should be aligned with only very limited freedom for relative sliding movement of one tray relative to another both parallel to and at right angles to the length of the trays. However, a construction of tray satisfying these requirements is not easily achieved, because in use starch powder settles on all upwardly facing surfaces around the periphery of the tray. While powder on the flat top surface of the upstanding peripheral wall is readily brushed off, the act of brushing is only likely to increase the accumulation of powder in any closed or partly closed recesses which may be provided to assist in the achievement of aligned stacking with minimal relative sliding movement between the trays in the stack. Any such accumulation of powder will lead to instability or lopsidedness of the stack, and the instability will tend to be cumulative as the height of the stack is increased.

It is an object of this invention to provide a starch tray which enables satisfactory stable aligned stacking to be achieved, in accordance with the above-described requirement.

BRIEF SUMMARY OF THE INVENTION

According to the invention, there is provided a rectangular starch tray adapted for aligned stacking on a similar tray with restricted freedom for sliding movement between the stacked trays both parallel to and at right angles to the length of the trays, each starch tray comprising a flat base with upstanding peripheral wall portions. The upstanding peripheral wall portions preferably include two side walls which project only in an upward direction at the side edges of the flat base. The peripheral wall portions further include two end walls which project in both an upward and a downward direction relative to the flat base of the starch tray. Portions of the downward projecting end walls are cut away over a central region of the ends walls in order to define four corner feet for the starch tray. Each end wall of the starch tray may be thought of as having a top surface, which is at a height above the flat base, and an outer end face. The outer end face of each end wall faces in a direction away (or outward) from the flat base of the starch tray and is positioned perpendicular to the flat base. The upstanding wall portions at the ends of each starch tray, i.e., the end walls, are each shaped over at least one part of the length thereof with at least one recess being provided in each end wall. Each recess has a bottom face which slopes from the top surface of an end wall to the outer end face of the end wall. Each recess also includes sloping end regions. The two corner feet at each end of the tray have respective elongate downward projections. The elongate downward projections are spaced apart by a sufficient distance from one another in order to enable the elongate downward projections to be located into the recesses, preferably the end regions of the recesses of another, similar starch tray located directly below a first starch tray. The bottom surface of each elongate downward projection should be appropriately sloped so as to be seated in the recess (preferably the end regions of the recess) of the starch tray located directly below when such trays are stacked.

Preferably, the upstanding end wall portions at the ends of the tray are each shaped over said central region thereof with only a single recess, whereby the projections of the two feet of the tray seat into opposite ends of said single recess on a similar tray on which the first tray is stacked.

The projections on the feet may be integrally formed with said feet, or may be constituted by dome-headed screws or like separately formed means fixed to the undersurfaces of said feet.

BRIEF DESCRIPTION OF THE DRAWINGS

The invention is exemplified with reference to the accompanying drawings, in which.

DESCRIPTION OF EMBODIMENTS

Figure 1:
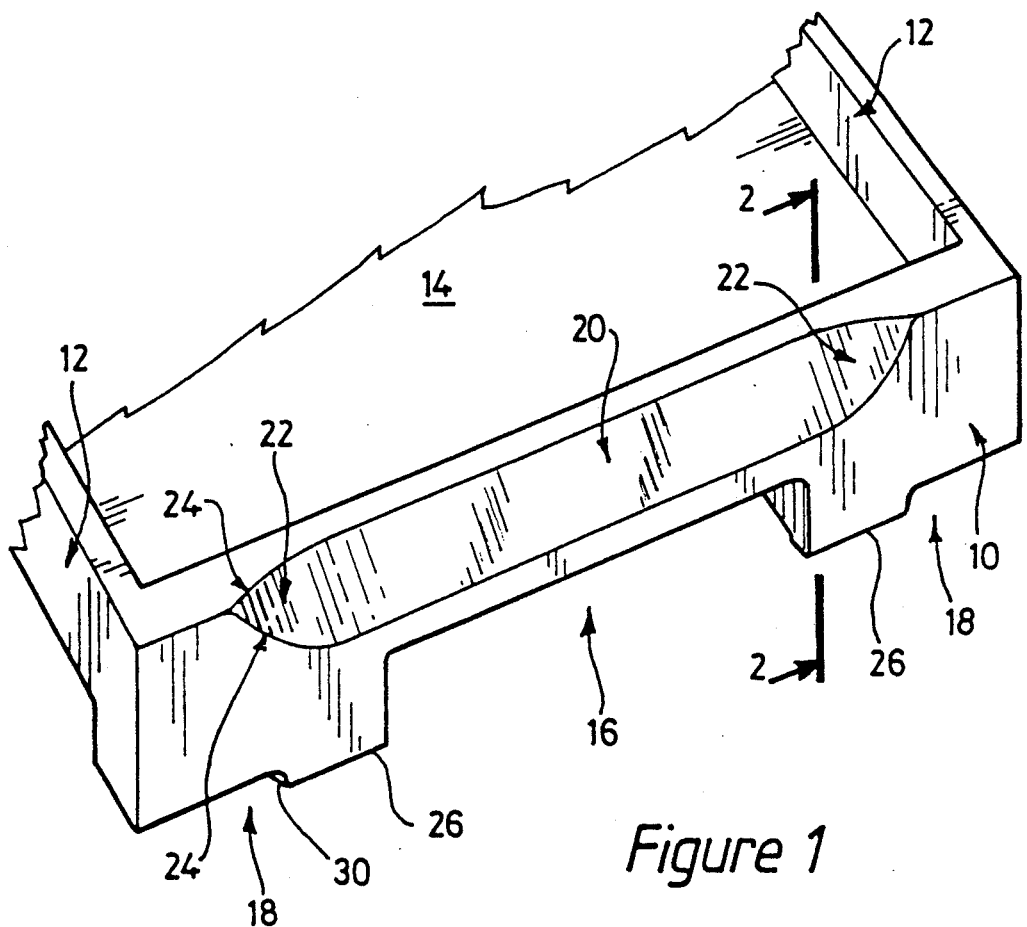
FIG. 1 is a perspective view of one end of a starch tray.
Figure 2:
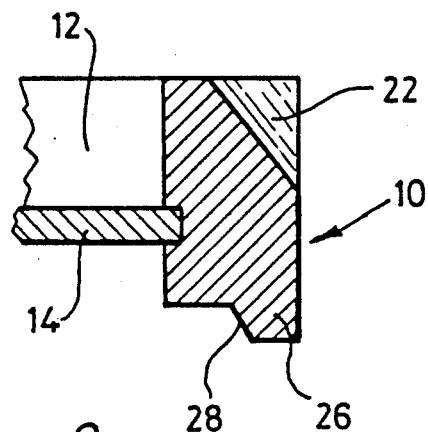
FIG. 2 is an elevational cross-section through an end wall, generally on the line 2—2 of FIG. 1.

Referring to FIGS. 1 and 2 of the drawings, there is shown in FIG. 1 one end region of a rectangular starch tray, typically made of hardwood timber. For reasons of clarity in illustrating the invention, the lines between component timber parts are omitted, but in practice the end wall referenced 10, the side walls referenced 12 and the flat base 14 are separately machined components, the side walls being comb jointed to the end wall and the edge of the base being located in a groove formed in the end wall in a common plane with a bottom edge rebate in the side walls.

Whereas the side walls 12 only project upwardly at the side edges of the base, the end wall 10 has a corresponding upstanding portion and a portion projecting downwardly beneath the level of the base. This downward projecting portion is cut away over a central region 16 effectively to provide corner feet 18 on the tray.

In order to achieve stable stacking of one tray on a similar tray, the end wall 10 is cut away with a sloping recess 20, the bottom face of the recess being substantially planar and extending from the top surface of the end wall to the outer end surface thereof. The end regions 22 of the sloping recess 20 are rounded, and slope laterally into the top and outer end surfaces of the end wall, as indicated at 24. Typically, the bottom face of the recess 20 lies at an angle of about 60 degrees to the top surface of the end wall and an angle of 30 degrees to the outer end surface.

Additionally, the feet 18 are formed with elongate downward projections 26, at positions generally aligned, across the width of the tray, with the end regions 22 of the sloping recess 20. The inner wall surface 28 (see FIG. 2) of each projection 26, and likewise the end wall surface 30 nearer the side of the tray, is inclined with a slope generally matching the slopes of the surfaces of the end regions 22 of the sloping recess 20, with a junction between these surfaces 28, 30 of the projection generally matched to the rounding at the ends of the regions 22. However, the positioning and shaping of the projections 26, in relation to the end regions 22 of the recess 20, is such that a small clearance or tolerance of approximately 1 mm exists when one tray is stacked on top of another with the projections 26 seated in the end regions 22 of the recess 20, both in the direction of the length of the trays and at right angles thereto. There is thus provided a very limited freedom for sliding movement between the two trays. This is advantageous when the trays are being stacked or destacked by machine, easing the positional accuracy required for stacking without introducing risk of instability of the stack.

The above-described arrangement which enables aligned stacking with minimal sliding movement between the trays, both in the longitudinal direction of the trays and transversely thereof, is particularly advantageous in that the stacking provisions do not include any upwardly facing recesses which are closed or partly closed around the edge by walls creating corners in which starch powder can accumulate and not readily be brushed out. Thus, starch powder tends to drop off the steeply sloping bottom face of the sloping recess 20, and any residue is readily brushed out without creating an accumulation at the ends of the recess, more especially owing to the rounded shaping provided at these ends.

Figure 3:
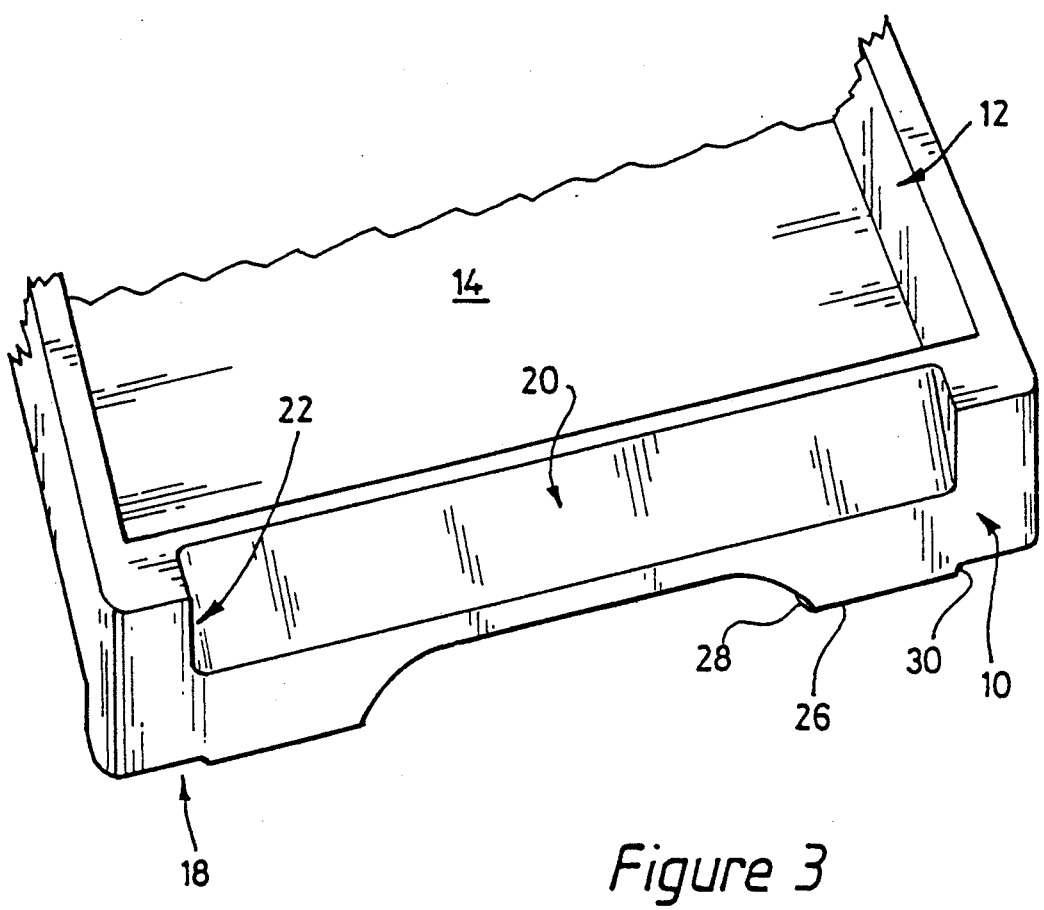
FIG. 3 shows one end of a modified tray.

FIG. 3 shows a modified tray wherein the recess 20 extends at its ends nearer to the corners of the tray, the end regions 22 of the recess are much less rounded, so that the recess has end walls lying in planes substantially normal to the length of the recess, and the projections 26 on the corner feet 18 correspondingly extend closer to the corners of the tray and have end walls 28, 30 modified in shape to suit the changed shape of the end regions of the recess.

In fact, the matching of the underside shape of the projections to the shape of the end regions of the sloping recess is not critical, and said projections could be formed by dome-headed screws or like separate elements fitted to the undersurfaces of the corner feet so that, when trays are stacked, the heads of the screws are located in the end regions of the recess very close to the sloping back wall and to the end walls of said recess.

Moreover, the recess 20 could be divided into two recesses, each extending towards the corner of the tray from a central part of the end wall which is not cut away.

Various further modifications of the above-described and illustrated arrangements are possible within the scope of the invention defined by the appended claims.

I claim:

1. A rectangularly-shaped starch tray adapted for aligned stacking on a similar tray with restricted freedom for sliding movement between the stacked trays, both parallel to and at right angles to a length of said starch trays, each of said starch trays comprising:
   a flat base; and,
   upstanding peripheral wall portions for said flat base, said upstanding peripheral wall portions including two side walls which project only in an upward direction at two oppositely-positioned side edges of said flat base, said peripheral wall portions further including two end walls which project in both an upward direction and a downward direction relative to said flat base with portions of the downward projecting end walls being cut away over a central region of each of the ends walls in order to define four corner feet for said starch tray, each of the end walls of said starch tray having a top surface, which is at a height above said flat base, and an outer end face with the outer end face of each the end wall facing in a direction outward from said flat base and being positioned perpendicular to the flat base, the end walls of said starch tray being shaped over at least one part of a length thereof with at least one recess being provided in each end wall with a planar bottom face which slopes from the top surface of said end wall to the outer end face of said end wall, the slope of the bottom face of said recess being approximately sixty degrees to the top of said end wall and approximately thirty degrees to the outer end face of said end wall, said recess further including sloping end regions, the two corner feet at each end of said starch tray having respective elongate downward projections which are spaced apart from one another in order to enable the elongate downward projections to be located into the recesses of a similar starch tray located directly below said starch tray when such starch trays are stacked.

2. The tray as claimed in claim 1, wherein said elongate downward projections are formed integrally with said corner feet.

3. The tray as claimed in claim 1, wherein said starch tray is made of wood.

4. The tray as claimed in claim 3, wherein said starch tray is made of hardwood timber.

5. The tray as claimed in claim 1, wherein said elongate downward projections are elongate in a direction of the length of said end walls.

6. The tray as claimed in claim 1, wherein undersurfaces of the elongate downward projections are shaped to complement the shape of the end regions of the recess.

* * * * *